United States Patent [19]

Dehlén

[11] 4,446,192

[45] May 1, 1984

[54] WEAR-RESISTANT RUBBER PRODUCT AND A METHOD OF MAKING SAME

[75] Inventor: Bengt L. A. Dehlén, Trelleborg, Sweden

[73] Assignee: Trelleborg AB, Trelleborg, Sweden

[21] Appl. No.: 261,226

[22] PCT Filed: Oct. 30, 1980

[86] PCT No.: PCT/SE80/00266

§ 371 Date: Jul. 16, 1981

§ 102(e) Date: Apr. 27, 1981

[87] PCT Pub. No.: WO81/01253

PCT Pub. Date: May 14, 1981

[30] Foreign Application Priority Data

Jun. 11, 1979 [SE] Sweden ........................ 7909159

[51] Int. Cl.[3] ........................ B02C 17/22; B32B 25/08

[52] U.S. Cl. .................................... 428/339; 241/183; 241/300; 241/DIG. 30; 264/261; 428/423.9; 428/424.8; 428/492; 428/493

[58] Field of Search .................. 428/423.9, 424.8, 492, 428/493, 339; 264/261; 241/183, 300, DIG. 30, DIG. 31

[56] References Cited

U.S. PATENT DOCUMENTS

| | | | |
|---|---|---|---|
| 3,686,389 | 8/1972 | Beneze | 264/261 |
| 3,895,146 | 7/1975 | Nishimaki | 428/35 |
| 4,064,215 | 12/1977 | Halada | 264/261 |
| 4,240,852 | 12/1980 | Gomberg | 428/423.9 |
| 4,311,181 | 1/1982 | Hausch | 428/423.9 |
| 4,327,138 | 4/1982 | Hausch | 428/423.9 |

*Primary Examiner*—Ellis P. Robinson
*Attorney, Agent, or Firm*—Beveridge, DeGrandi and Kline

[57] ABSTRACT

A wear-resistant rubber product adapted to be used as, for example, a lifter in grinding mills, comprises at least two prefabricated parts (11, 12) interconnected with one another by means of a binder layer having a thickness of at least 2 mm and consisting of in situ cast and cured polyurethane. The wear-resistant rubber product is manufactured by placing the prefabricated cured rubber parts (11, 12) at a distance of at least 2 mm from one another and by introducing, preferably injecting a reacting urethane rubber composition with excess isocyanate groups into the gap (13) to cause said prefabricated parts on either side of said gap to be contacted subtantially simultaneously by the said urethane rubber composition.

6 Claims, 2 Drawing Figures

WEAR-RESISTANT RUBBER PRODUCT AND A METHOD OF MAKING SAME

Figure 1:
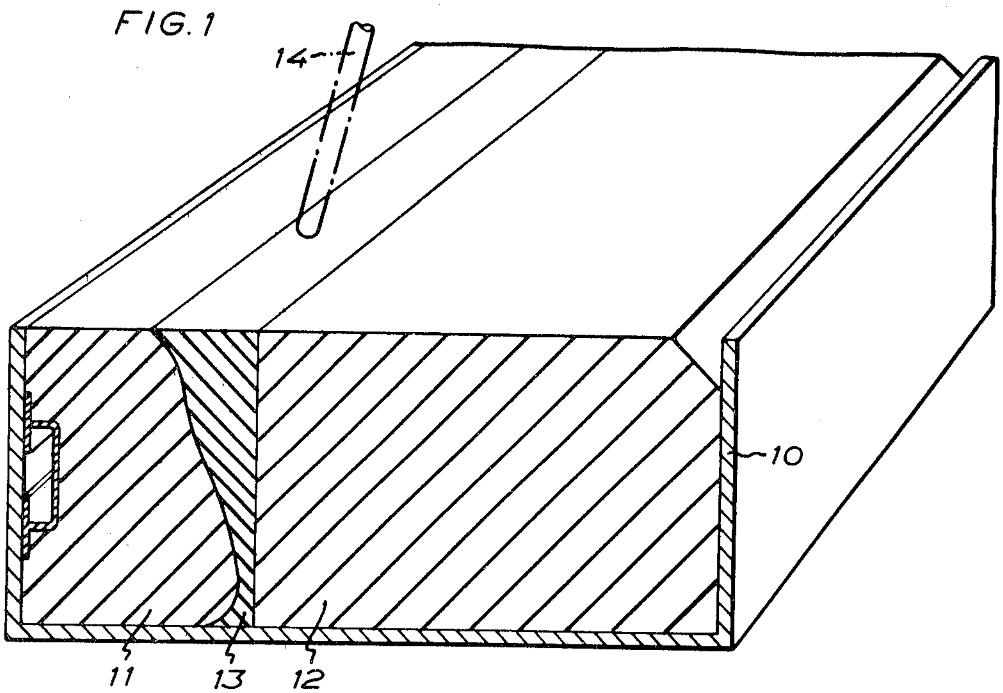

Wear-resistant rubber products are used to a large extent in the mining industry, especially in chutes and, primarily, in mills for grinding ore. In such mills, use is made of a wear-resistant lining consisting of shell plates and so-called lifters which extend into the drum mill and stir the charge within the rotating mill drum and which therefore are subjected to an exceptionally high wear. In view hereof, the lifters must be replaced on more than one occasion during the life of the mill lining or, strictly speaking, the shell plates. Normally, the worn lifters are replaced by new ones, and the worn lifters frequently are scrapped. The worn-out lifters usually still carry large quantities of rubber since the lifters must be replaced before the grinding capacity which is dependent upon the lifter geometry, has decreased to an unacceptably low level. In order to reduce waste of lifter material, it has therefore been suggested, for instance in U.S. Pat. No. 3,191,875 and Swedish patent specification No. 335,460, gradually to raise the lifters in relation to the shell plates, thereby to use up as much rubber as possible. It has also been tried to recap rubber lifters by using recapping methods well known in connection with the recapping of motor vehicle tires, the strength requirements necessitating the technique of hot recapping.

However, the recapping methods used in the tire industry are not readily adapted to the recapping of lifters because the worn rubber lifter must be thoroughly buffed and washed and given a primer coating and because vulcanization must be carried out for a considerable period of time under heat and pressure in expensive vulcanizing moulds of steel in order to produce a bond of sufficient strength. Furthermore, some of the known recapping methods require access to special equipment. The application of pre-vulcanized treads to used carcasses requires careful shaping (abrading) of the rubber surface of the used detail to make it conform to the shape of the new vulcanized rubber detail which is vulcanized to the old rubber detail.

It therefore is an object of the present invention to provide a new wear-resistant rubber product which has the properties of the original product and which, besides, is readily manufactured. Furthermore, the invention comprises a novel method of making this product.

According to the invention, a wear-resistant rubber product which is to be used as, for example, a lifter in grinding mills thus comprises at least two prefabricated parts interconnected by means of a binder layer of in situ cast and vulcanized polyurethane having a thickness of at least 2 mm (preferably at least 5 mm). The wear-resistant rubber product is made by placing the prefabricated vulcanized rubber parts at a distance of at least 2 mm (preferably at least 5 mm) from one another and filling the gap with a reacting urethane rubber composition with excess isocyanate so that the prefabricated parts on either side of the gap are contacted substantially simultaneously by said urethane rubber composition. The characteristic features of the invention are stated in the claims.

The wear-resistant rubber product may be either a new product or a recapped product in which parts of a used corresponding wear-resistant rubber product have been connected with at least one prefabricated vulcanized wear-resistant rubber body by means of the in situ cast and vulcanized urethane rubber layer, said prefabricated and vulcanized rubber body having a profile adapted to that of the future product. Since the conditions of prefabricating this rubber body are far more readily controlled, a high-quality wear-resistant rubber body can be obtained. Hot recapping by vulcanizing an uncured rubber compound to an old and worn product in a vulcanizing mould always necessitates a compromise between on one hand the vulcanization of the newly supplied rubber compound and thus the properties and adhesive power of said compound in the vulcanized state and, on the other hand, the risk of overcuring or scorching of the rubber material of the old and worn product to be recapped.

When the invention is applied to the manufacture or recapping of mill lifters, the product may be formed of at least two parts, one of which comprises a holder and the other consists of a prefabricated cured wear-resistant rubber body of a profile suitable for the future lifter. For the recapping, the part comprising the holder consists of a worn lifter, the surface of which is prepared by cleaning and, if necessary, also by buffing. Such a worn lifter may comprise a metal component with attachment means and a rubber part vulcanized thereto. The prefabricated part or parts used for the manufacture may consist of extruded or moulded cured wear-resistant rubber bodies which, however, must be relieved of their vulcanization skin by some simple surface treatment, such as sawing or cutting. On the other hand, it is not always necessary to buff the rubber bodies, and no primer need be applied. Thus, the cured wear-resistant rubber bodies and the worn lifter can be processed with equipment less expensive than that used in, for example, the complete or partial recapping of tires.

During manufacture, the prefabricated parts preferably are placed on a casting substrate in such a manner that the minimum spacing between their surfaces to be interconnected will be 2 mm, preferably 5 mm. In this manner, a gap is formed, the ends of which are closed to form an upwardly open mould cavity into which the reacting urethane rubber composition is then introduced, preferably injected. The minimum spacing of 2 mm, preferably 5 mm, is conditioned by the requirement that it shall be possible for the reacting urethane rubber composition safely to enter and fill out the gap between the bodies and to contact the bodies substantially simultaneously.

The rubber parts to be joined together may have room temperature when contacted by the hot urethane rubber composition. On the other hand, it is often convenient to dry and preheat the prefabricated parts before the urethane rubber composition is cast because such drying and preheating reduces the risk of bubble formation within the in situ cast urethane rubber composition. Moreover, it was found that one can be sure to obtain satisfactory strength values if the prefabricated parts are preheated. The urethane rubber composition preferably is introduced at a temperature of 75°–150° C. The upper limit is conditioned by the fact that the time or pot life during which the compounded urethane rubber composition can be used will be too short if the casting temperature exceeds 150° C.

The invention will be described in more detail in the following, reference being had to the accompanying drawing in which FIGS. 1 and 2 diagramatically illustrate two possible procedures in the manufacture of a wear-resistant rubber product according to the present invention.

FIG. 1 shows a casting mould 10 in which a worn lifter 11 and a prefabricated wear-resistant rubber body 12 have been placed lying on their sides, such that a gap 13 having a minimum width of at least 2 mm is formed therebetween. The gap is being filled with a reacting urethane rubber composition from an injection nozzle 14 which is moved along the gap and in which the components of the urethane rubber composition are mixed immediately before the composition leaves the nozzle. The injection nozzle preferably is inserted into the gap, thereby to cause the liquid urethane rubber composition to rise and gradually to expel the air within the gap and to contact both rubber bodies substantially at the same time.

Figure 2:
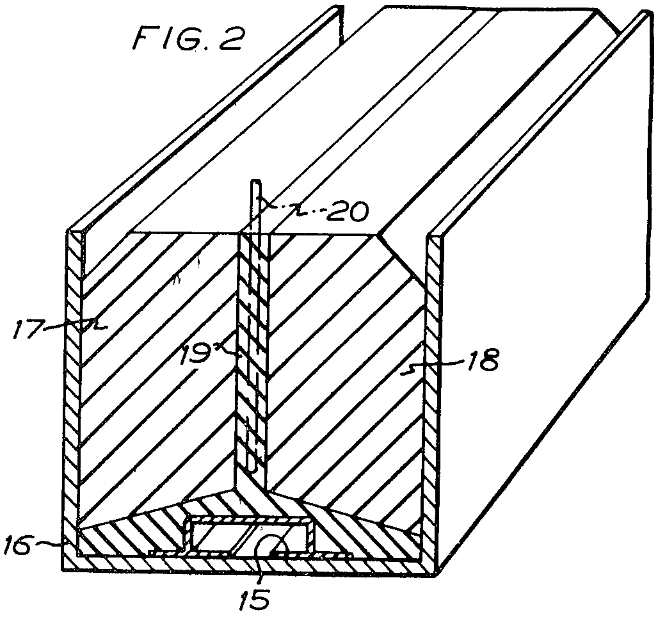

FIG. 2 shows the manufacture of a new wear-resistant rubber body according to the present invention, the components of which have not previously been used. In this case, a sectional metal element 15 has been placed in the center of the bottom of a casting mould 16. Two prefabricated, cured wear-resistant rubber bodies 17, 18 have been rigged up in the casting mould by means of small spacer members (not shown) provided at the ends thereof and, if necessary, also at one or more points along the length of the rubber bodies so that an inverted Y-shaped gap 19 is formed between the bodies 17, 18 and the sectional metal element 15. A needle-shaped nozzle 20 is used for filling the gap 19 with the liquid reacting urethane rubber composition.

The invention will now be illustrated in more detail, reference being had to the following Examples.

EXAMPLE 1

In this Example, use was made of a worn lifter, the rubber part of which was formed of wear-resistant rubber based upon styrene-butadiene rubber and having a hardness of 60° Shore A. The worn lifter is cleaned and slightly buffed on its surface. The lifter had a length of 1 m and a width of 2 dm. The lifter and a prefabricated sectional rubber element of the same rubber type were placed overnight in a warming cupboard having a temperature of 110° C. The bonding surface of the prefabricated sectional rubber element was conditioned by removal of a surface layer. The lifter was laid on its side on a plastic fabric (polytetrafluoroethylene) on a casting table. The sectional rubber element was placed alongside of the lifter, such that the minimum distance between this surface and the curved worn surface of the lifter was at least 2 mm. The ends of the resulting gap between the lifter and the sectional rubber element were sealed by pressing mould side walls against the lifter and the rubber sectional element. A reacting urethane rubber composition was then injected into the gap by means of the nozzle of a mixer/injector that was inserted in the gap in order to fill said gap while expelling the air. In this manner, the two rubber surfaces were contacted with the reacting urethane rubber composition substantially simultaneously, which is of essential importance to the reliability of the bond.

For the urethane rubber composition, the following two-component system was used:

Prepolymer 100 parts by weight polyester prepolymer having about 6.5% of available isocyanate groups (MDI, i.e. methylene-bisphenylene-diisocyanate)

Curing agent 33.6 parts by weight hydroxyl-terminated polyester 3.7 parts by weight 1,4-butanediol This recipe implies a curing agent content of 95%, based upon the available isocyanate groups.

The two rubber details had a temperature of 90°-100° C., and the urethane rubber composition injected into the gap had a mixing temperature of 110° C. After the gap had been filled, the components were left on the casting table until the urethane rubber composition had solidified and obtained sufficient strength to allow handling of the lifter and the sectional rubber element attached thereto. The product was then stored at room temperature for 72 hours.

From the lifter and the sectional rubber element vulcanized thereto transverse test pieces having a thickness of 25 mm were taken by sectioning. The pieces or samples were then subjected to adhesion tests, so-called peeling tests. The peel strength was found to be 26.5 kN/m, the rupture occuring in the styrene butadiene rubber material, not in the joint between the urethane rubber and styrene butadiene rubber materials.

EXAMPLE 2

Example 1 was repeated, and both rubber components were buffed. The peel strength was found to be somewhat lower, 24.8 kN/m, and the rupture occured in the styrene butadiene rubber material. This shows that it is not necessary to buff the surfaces in order to establish adhesion between polyurethane and rubber, and that a cut surface (Example 1) is sufficient. However, the vulcanization skin of the prefabricated sectional rubber element must be removed.

EXAMPLE 3

Example 1 was repeated, except that no drying and preheating in a warming cupboard occured, which means that both rubber components had room temperature. The peel strength was 14.6 kN/m, and the rupture occured in the joint between the rubber materials. This test shows that an acceptable strength is obtainable also with cold rubber, but that higher strength values will be obtained if the rubber components are preheated and dried.

EXAMPLE 4

In this Example, worn lifters and prefabricated sectional rubber elements of the same material and having the same dimensions as the lifter and the sectional rubber element of Example 1 were used. As in Example 1, the worn lifters were cleaned and slightly buffed, and a surface layer of the sectional rubber elements was removed to expose fresh rubber. The lifters and the sectional rubber elements were preheated overnight in a warming cupboard having a temperature of 100° C. Each lifter was then placed in a shallow casting mould which stood on a casting table and had such dimensions that the lifter in upright position, i.e. with the metallic holder facing downwardly, fitted closely in the casting mould, the edges of which protruded beyond the rubber part of the worn lifter. In a first test, the lifter was covered with the urethane rubber composition stated in Example 1, and the sectional rubber element was gradually pressed down into the reacting urethane rubber composition within half a minute. In a second test, the sectional rubber element was pressed down into the reacting urethane rubber composition 2 minutes after the lifter placed in the casting mould had been covered with the urethane rubber composition. 72 hours after casting, an adhesion test was made, and the peel strength was found to be 18.6 kN/m in the first test and but 6.2 kN/m in the second test. This Example shows that it is of essential importance that the rubber bodies to be joined together will contact the urethane rubber composition substantially simultaneously.

EXAMPLE 5

Example 2 was repeated with a polyether prepolymer and a different curing agent composition. The rubber material in the lifter and in the sectional rubber element was the same as in Example 1. The prepolymer and the curing agent composition were as follows:

Prepolymer

100% by weight polyether prepolymer with about 7.7% of available isocyanate groups (MDI)

Curing agent 4.6 parts by weight 1,4-butanediol
3.2 parts by weight 1,3-butanediol 72 hours after casting, an adhesion test was carried out, and the peel strength was found to be 25.4 kN/m. The rupture occured in the styrene butadiene rubber material, not in the joint between the rubber materials.

I claim:

1. A wear-resistant rubber product adapted to be used as a lifter in grinding mills, said product comprising at least two prefabricated parts, one of said parts including a holder for mounting said product, the other said part being a prefabricated vulcanized wear-resistant rubber body having a profile corresponding to the intended profile of a portion of the rubber product, said parts being interconnected with one another by means of a binder, characterized in that the binder consists essentially of a layer of urethane rubber cast and vulcanized in situ between said prefabricated parts, said layer having a thickness of at least 2 mm.

2. A product as claimed in claim 1 wherein the part comprising the holder is a worn rubber product of the intended type.

3. A product as claimed in claim 1 wherein said layer has a thickness of at least 5 mm.

4. A product as claimed in claim 1 wherein said holder for mounting the product includes means for attaching the product to a rotating drum of a grinding mill, and the other said part includes a lifter portion which has a profile operable as a lifter in a grinding mill.

5. A wear-resistant lining for installation in a rotating drum of a grinding mill comprising at least two prefabricated parts, one said part including holder means for attaching it to a rotating drum of a grinding mill, the other said part being a lifter portion formed of prefabricated vulcanized wear-resistant rubber, said lifter portion having a profile corresponding to the intended profile of a portion of said lining, said parts being interconnected with one another by a binder which consists essentially of a layer of urethane rubber cast and vulcanized in situ between said prefabricated parts, said layer having a thickness of at least 2 mm.

6. A wear-resistant lining as claimed in claim 5 wherein the one said part is a worn lifter of a grinding mill.

* * * * *